Figure 1:
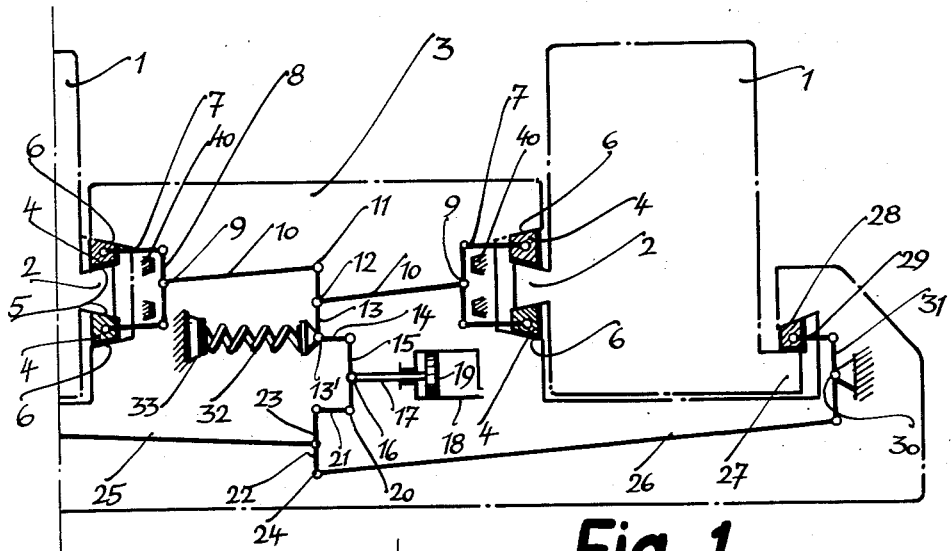

Sept. 20, 1960　　G. WANINGER ET AL　　2,952,894
CLAMPING IN MACHINE TOOLS
Filed April 4, 1955

Inventors
G. Waninger
M. A. Muller

United States Patent Office 2,952,894
Patented Sept. 20, 1960

2,952,894

CLAMPING IN MACHINE TOOLS

Gilbert Waninger, Am Schwarzen Barth 28, Siegen, Westphalia, and Max Adolf Muller Blumenthalstrasse 9, Koln (Rhine), Germany Filed Apr. 4, 1955, Ser. No. 499,133

Claims priority, application Germany Apr. 8, 1954

11 Claims. (Cl. 29—1)

The clamping of the cross beam to the columns of double column machine tools as, for example, double column planing machines, is usually effected by a clamping claw, or better a clamping bar extending over a substantial length, carried on the cross beam, being pressed under the action of a pressure device, for example an hydraulic cylinder, a screwed spindle or the like, and corresponding transmission members, against a machined surface rib, groove or the like provided for the purpose on the columns. Such clamping arrangements as a rule act simultaneously at at least two, and often four, places in order to secure the cross beam stiffly and free from vibration in relation to the columns.

The disadvantage of these known clamping arrangements is that the path of the forces which are brought into play by clamping extend through the whole cross beam and from this through the columns and the top connecting member and/or the foundation back to the cross beam. The path of the forces is therefore very circuitous and of considerable length, all the parts lying in the path being correspondingly loaded. This results in deflections of the cross beam and the columns which, in turn, involve inaccuracies in adjustment and in machining.

According to the invention the cross beam clamping is effected basically and at all points in such a way that the path of the forces is very short and is limited to the individual elements which accordingly can be constructed or shaped very strongly.

It is known to effect clamping involving a very short path for the forces by means of that pincer-like arrangement in which the part held in the pincers is stressed under pressure and thus relatively only slightly deflected while the pincer limbs are short and the forces are only transmitted through a short path through the limbs and their connecting point and the clamped object. This mode of clamping with a very short path for the forces has also been proposed in machine tool construction, in the use of clamping or wedge strips or the like which clamp a holding strip to a guide directly opposite a machine part moving on the guide, for example a carriage. Here also the path of the forces is very short. The use of this clamping system has in part already been proposed on double column machine tools, but always locally and not exclusively, and in addition use was always made of the above described mode of clamping which involves a long path for the forces. The essence of the invention consists, however, in the clamping of the cross beam in relation to the columns being effected exclusively in this manner which results in a short path for the forces because the clamping previously used of the above described disadvantageous character involves all the disadvantageous results in full measure, even if it is used only at two clamping points.

Accordingly, the clamping of the cross beam in relation to the columns in accordance with the invention is effected by a plurality of, say four, holding ribs secured to the columns and a corresponding number of pairs of clamping bars which engage the holding ribs from both sides between them and which are so movably connected with the cross beam that when they are moved they exert a pressure on two opposite sides of the holding ribs pincer fashion.

The movable mounting of the clamping bars is effected so that at least a pincer-like movement is possible. It is desirable, however, beyond this to arrange the movable mounting in such a way that the clamping bars can adapt themselves to a certain degree of inaccuracy in the machining of the holding ribs, for which purpose, for example, one clamping bar may be moved more than the other. This is important because the above described manner of clamping between the part to be moved, namely, in this case the cross beam, and a clamping bar in relation to a holding rib on the columns, is effected at the ends of the cross beam so that the position of the cross beam is determined by these means. If now clamping in accordance with the invention by clamping arrangements provided with two clamping bars were positively effected in such a way that each clamping bar moved through a precise predetermined clamping path a redundant or over rigid structure would result, and additional stresses would be produced in the cross beam and columns. The mode in which the clamping bars are movably mounted in relation to the columns depends therefore on the number of clamping points and their particular construction.

In order to obtain a good clamping action it is desirable to give the holding ribs on the columns a dovetail profile at least on one side. It is further desirable to construct the clamping bars as wedge bars in the manner in itself known. In addition to this, other usual arrangements can be made use of. Thus, for example, it is desirable to move all the pairs of clamping bars from a common source, for example an hydraulic drive in the manner in itself known, so that the same clamping pressure arises in all pairs. Departing to a certain extent from this basis some of the clamping bars can, however, be given a preload which is exerted by springs, hydraulic means or the like acting directly on them but not on the other clamping bars and which, for example when the cross beam is to be moved can be taken out of action and the effect of which is that the clamping first takes effect at these places, and for example presses the cross beam against the guide surfaces which lie in the front plane of the columns before the clamping at the other places comes into action.

The movable mounting of the two clamping bars belonging to a pair above mentioned can be effected making use of the differential principle by connecting them together, for example with a two armed lever—a so-called double lever—to the mid point of which the clamping force is applied. In this way, the result is obtained that the clamping force is transmitted substantially equally to the two clamping bars and these bear under the same pressure against the holding rib. In a similar way equal distribution of pressure can be obtained not only between the two clamping bars of a pair, but also between different clamping locations, in which case only a single source of clamping force, for example an hydraulic cylinder need be used which is connected by double levers of the above described character arranged in series and corresponding connecting rods with the various pairs of clamping bars, in which case it is naturally necessary that all the double levers leading to the pairs of bars should be freely movably mounted over the whole series, that is, should not be connected at a fixed point to the cross beam.

As already indicated at the clamping places which are provided at the ends of the cross beam near the front plane of the columns, the known mode of clamping with a short path for the forces may be used, which consist therefore of but one clamping bar engaging the holding rib on the column from behind the cross beam itself acting as the second pincer member, and accordingly the mid point of the end double lever on the cross beam must be pivoted in fixed position on the beam. Stressing of the cross beam and deflection are not in this case to be expected because here again the path of the forces is not greater than in the case of the use of pairs of clamping bars.

Figure 1A:
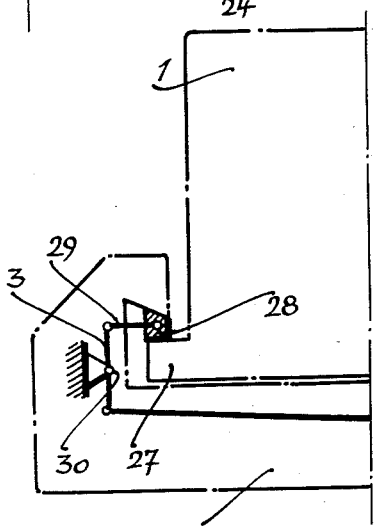
Figure 2:
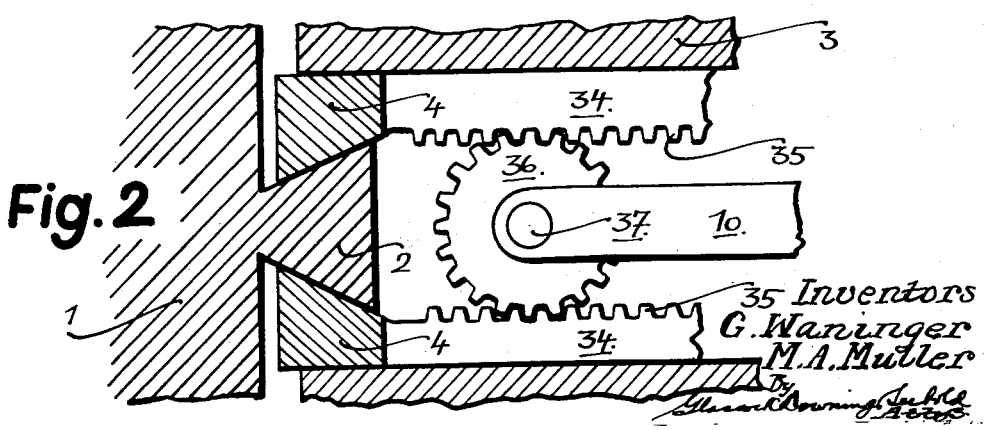

The invention will be further described with reference to the accompanying drawing, in which:

Figs. 1 and 1a is a diagrammatic section through a two column machine incorporating the invention, Fig. 1a being the continuation of Fig. 1 at the left hand side of Fig. 1, and Fig. 2 is an enlarged diagrammatic section of a modification.

In Figs. 1 and 1a the columns 1 on their inner surfaces have holding ribs 2 which are secured to them, for example cast integrally, and preferably of dovetail profile, while on the cross beam 3 two pairs of clamping bars 4 are provided, the inner surfaces 5 of which correspond to the dovetail profile of the holding ribs, while their outer surfaces 6 may be of wedge form and are guided by corresponding counter-surfaces or abutments on the cross beam. The clamping bars 4 are connected by rods 7 to a lever 8 having two equal arms for each pair of clamping bars, the movement of which is limited by stops 40 and of which the mid point 9 is in each case connected to a pull rod 10 independently of the cross beam. The ends of the pull rods 10 near the centre of the cross beam are pivotally connected one to the end point 11 and the other to the mid point 12 of a further equal armed lever 13 which through a link 14 is connected to a corresponding double lever 15. The mid point 16 of this double lever 15 is pivoted to the piston rod 17 of a piston 19 of an hydraulic cylinder 18, while the other end point 20 of the double lever 15 is connected by a link 21 with another double lever 22 to the mid point 23 and the other end point 24 of which respective connecting rods 25, 26, are connected which lead to clamping points arranged at the ends of the cross beam 3. The clamping arrangements at these points consist of holding ribs 27, on the columns and wedge form clamping bars 28 slidably mounted on the cross beam which through pull rods 29 are connected to double levers 31 pivoted at their mid points to pivots 30 located at fixed positions on the cross beam.

A spring 32 may bear against the end of lever 13 at pivot 13' and abuts a fixed point on the cross beam at 33. This compression spring 32 provides a preload which produces a preliminary clamping of the two outer ribs 27, so that the beam is first clamped here though with a small clamping force derived from the spring, while thereafter upon actuating the cylinder 18 all the clamps are simultaneously actuated by the piston rod 17 being forced out of the cylinder.

In Fig. 1 it will be noticed that as piston 19 moves to the left toward full clamping position movement of link 14 to the left is resisted by spring 32 so link 21 moves to the left until resisted by connecting rods 25 and 26 which, of course, do not resist until holding ribs 27 are clamped by clamping bars 28. As piston 19 continues to move spring 32 will be compressed and point 12 on lever will move to the left and point 11 will move to the right. It is further apparent that each of the points 11, 12, 23, and 24 can move as far as is required to first take up any play or wear, and second to effectuate the same degree of clamping in each clamp.

When piston 19 is moved to the right toward full unclamping position the spring 32 follows the movement so that the clamping bars 4 release ribs 2 immediately and clamping bars 28 only release ribs 27 at the end of the stroke.

The invention can be used not only on double column machine tools but also on other arrangements in which simultaneous clamping of an object at several different points is desirable with closed force paths each extending over a small region.

In Fig. 2 a particular and advantageous coupling of a pair of clamping bars is shown on a larger scale. As before the holding rib 2, for example of dovetail profile is shown integrally cast and enclosed on the sides between two corresponding clamping bars 4. It will be understood that these extend as prisms perpendicular to the plane of the drawing over a comparatively long distance, preferably over the whole height of the cross beam and at the centre of their length are provided each with a toothed rack 34, the toothing 35 of the two racks being opposite one another. Between the two racks and meshing with them is a corresponding differential member in the form of a pinion 36 rotatable on the axis 37. The pull rod 10 which is the same as the pull rod 10 of Fig. 1 is attached to axis 37. This arrangement has the advantage over the use of a double lever that the lever arm is always equal to the radius of the pinion so that unequal inclination of the double lever and connecting rods at the clamping places cannot arise with resulting differences in pressure but equal pressures are ensured.

This arrangement can be similarly used in place of any of the other double levers. It is possible also to replace the lever systems by rolling systems of other kinds having the same effect.

We claim:

1. In a machine tool having two parallel frame members and a cross member movable on said frame members, the combination of a plurality of holding ribs secured to said parallel members extending parallel with the direction of movement of said cross member, pairs of movable clamping bars of wedge section mounted on said cross member, abutment means on said cross member adjacent each said clamping bar and having complementary surfaces over which said bars move, the two bars of each pair of clamping bars engaging a holding rib between them, and means on said cross member for moving said clamping bars in a direction normal to the direction of motion of said cross member on said frame members, said means for moving said clamping bars comprising a double armed lever for each said pair of clamping bars, each said lever having its ends operatively connected to the clamping bars of a pair of clamping bars, and means for applying a force to the mid points of said levers whereby the clamping bars of each pair are operated simultaneously and equally to press said clamping bars against the sides of said holding ribs.

2. In a machine tool having two parallel frame members and a cross member on said frame members, the combination of a plurality of holding ribs secured to said parallel members extending parallel to the direction of movement of said cross member, pairs of movable clamping bars on said cross member, abutment means on said cross member adjacent each clamping bar, the two bars of each pair of clamping bars engaging a holding rib between them, and means on said cross member for moving said clamping bars in a direction normal to their length so that each pair of clamping bars exerts pressure on opposite sides of the holding rib between them, a common driving member and a linkage whereby all the pairs of clamping bars are actuated from the common driving member, and resilient means for applying a preload to some of the clamping bars so that the clamping system first takes effect through these clamping bars.

3. In a machine tool having two parallel frame members and a cross member movable on said frame members, the combination of at least one holding rib on the outside of each said frame member near the front face thereof, a clamping bar mounted for movement in a plane parallel to said cross member and normal to its direction of movement on said frame members engaging the holding rib from behind, means pivoted to said cross member near each end thereof for moving the clamping bar, said clamping bar and said holding ribs having complementary wedge faces so that the clamping bar and the adjacent part of the cross member clamp the holding rib pincer fashion upon movement of said clamping bar under the influence of said lever, an additional holding rib on each of said frame members, a pair of complementary wedge shaped clamping bars movably carried on said cross member and engaging the additional rib between them, and means on said cross member for moving the pairs of clamping bars so that each said pair of clamping bars presses on opposite sides of the corresponding rib between them thereby clamping each rib pincer fashion.

4. A machine tool as set forth in claim 3 having common driving means for actuating all the clamping bars simultaneously.

5. A machine tool as set forth in claim 4, including a linkage between said driving member and said clamping bars, said linkage including double armed levers and connecting rods, the double armed levers being freely mounted so that the distribution of forces to the various clamping bars is determined by the proportions of the arms of the several levers.

6. In a double column machine tool having a cross beam guided on the columns so as to be movable along them, the combination of a holding rib on the outside of each column, adjacent the front surface thereof and parallel with the direction of movement of said cross beam, a wedge section clamping bar engaging the rear of each said holding rib and movably mounted on said cross beam for movement transverse to the movement of said cross beam on said columns, a second holding rib on the inside of each said column extending parallel to the direction of movement of said cross beam, two pairs of further wedge section clamping bars, each pair being mounted on said cross beam for movement transverse to the movement of said cross beam on said columns and engaging opposite sides of one of said second holding ribs, counter-surfaces on said cross beam co-operating with all said clamping bars whereby as the clamping bars are moved with respect to said cross beam they are pressed against the respective holding ribs, an hydraulic cylinder and piston on said cross beam, a freely mounted balance member linked to said piston, second and third freely mounted balance members linked to said first balance member, connecting rods linking said second balance member to respective levers pivoted to said cross beam near the ends thereof and linked to said first mentioned clamping bars, fourth and fifth freely mounted balance members linked to said respective pairs of clamping bars, and further connecting rods linking said third balance member to said fourth and fifth balance members.

7. A machine tool as set forth in claim 6 also including a spring bearing against one of said balance members and acting in such direction as to apply clamping pressure through both first mentioned clamping bars only.

8. In a machine tool, a stationary member, a slidable member, holding ribs on said stationary member parallel to the direction in which said slidable member may slide, a pair of clamping bars mounted on said slidable member extending parallel with and adjacent each of said holding ribs, abutments on said slidable member adjacent the said clamping bars remote from said holding ribs, said clamping bars and said holding ribs being wedge shaped in a direction normal to the direction of sliding of said slidable member and complementary to each other, and means to move said clamping bars with respect to said holding ribs, said means including levers, said clamping bars being each operatively secured to an end of a lever, and a tension element operatively secured to the mid point of each said lever, means to stress said tension elements, whereby upon stressing said tension elements said bars will grip said holding ribs by wedge action between said holding ribs and clamping bars against said abutments.

9. The device of claim 8 in which each said means for moving a pair of clamping bars is secured to means for actuating all said means simultaneously.

10. The combination with the uprights and the cross-rail of a machine tool such as a planer of means for clamping the cross-rail to the uprights, said means for clamping comprising holding ribs on said uprights extending parallel to the motion of said cross-rail on said uprights, a pair of abutment surfaces parallel to and spaced from the sides of each said holding ribs, clamping bars interposed between said abutments and holding ribs mounted on said cross-rail, said holding ribs and clamping bars having complementary wedging faces whereby upon movement of said clamping bars on said cross-rail in a direction normal to the direction of movement between said cross-rail and uprights said holding ribs will be clamped by said clamping bars.

11. The combination of claim 10 in which each clamping bar is provided with actuating means including a toothed rack portion, the teeth of which extend toward the teeth of the rack portion of the complementary clamping bar, and a pinion wheel is mounted between and in meshing engagement with said rack portions of said clamping bars of said pair, and in which actuating means for said pair of clamping bars is pivotally secured to the axis of said pinion whereby both said clamping bars of said pair of clamping bars are operated simultaneously and equally.

References Cited in the file of this patent

UNITED STATES PATENTS

| | | |
|---|---|---|
| 1,666,431 | Trosch | Apr. 17, 1928 |
| 1,858,898 | Mesker | May 17, 1932 |
| 2,049,842 | Kling | Aug. 4, 1936 |
| 2,099,674 | Bullosk et al. | Nov. 23, 1937 |
| 2,123,825 | De Vlieg | July 12, 1938 |
| 2,382,392 | Berthiez | Aug. 14, 1945 |